United States Patent
Kamimura et al.

[11] 4,369,474
[45] Jan. 18, 1983

[54] PLAYER FOR MAGNETIC TAPE CARTRIDGE RECORDINGS

[75] Inventors: Teturo Kamimura; Masahiro Komatsubara; Shizuo Ando; Takuzi Inanaga, all of Kawagoe, Japan

[73] Assignee: Pioneer Electronic Corporation, Tokyo, Japan

[21] Appl. No.: 220,984

[22] Filed: Dec. 29, 1980

[30] Foreign Application Priority Data

Dec. 29, 1979 [JP] Japan .......................... 54-171501

[51] Int. Cl.³ ........................................... G11B 15/66
[52] U.S. Cl. ............................... 360/96.1; 242/198; 360/93; 360/96.5
[58] Field of Search ......................... 360/96.5–96.6, 360/96.1, 93, 137, 105; 242/197–200, 206, 208

[56] References Cited

U.S. PATENT DOCUMENTS

| | | | |
|---|---|---|---|
| 3,627,185 | 12/1971 | Trammell | 360/93 |
| 3,870,247 | 3/1975 | Carisey | 360/96.6 |
| 3,909,845 | 9/1975 | Rothlisberger | 360/93 |
| 3,950,787 | 4/1976 | Hosaka | 360/96.6 |
| 4,069,506 | 1/1978 | Ueno | 242/199 |
| 4,257,075 | 3/1981 | Wysocki et al. | 360/93 |

FOREIGN PATENT DOCUMENTS 55-122262  9/1980  Japan .......................... 360/96.5

*Primary Examiner*—Alfred H. Eddleman
*Attorney, Agent, or Firm*—Armstrong, Nikaido, Marmelstein & Kubovcik

[57] ABSTRACT

A player for magnetic tape recordings is provided which comprises a cartridge holder adapted to receive therein a cartridge, a guide mechanism adapted to advance the holder in a horizontal state or slantwise state and move vertically the whole or a part of the holder at the final stage of the cartridge receiving operation. The player also includes a head adapted to be inserted into an opening of the cartridge at a position where the advancement of the cartridge is stopped. The head is mounted on the leading edge of the holder such that they are movable in integral fashion. The head can be preset at a position which permits selection of musical performances simultaneously with insertion of the cartridge into the holder. The head is thereafter set at the playback position.

10 Claims, 5 Drawing Figures

4,369,474

PLAYER FOR MAGNETIC TAPE CARTRIDGE RECORDINGS

BACKGROUND OF THE INVENTION

The present invention relates to a player for magnetic tape recordings of the slot-in system (hereinafter referred to as the tape player), such as car stereophonic players capable of selecting any musical performance recorded in the tape.

In the conventional tape player of such a type, a head is mounted on the body of the player. In operation, a cartridge is inserted into the player in a horizontal state and then elevated vertically to a position where the head contacts the tape for detecting non-recorded areas between musical performances. Thus, it is required to advance the head to the playback position through a position which permits the selection of musical performances, thus rendering the player mechanism complicated.

SUMMARY OF THE INVENTION

An object of the present invention is to provide a solution to the above-mentioned problem. According to the present invention, this is achieved by the provision of a compact and lightweight tape player which permits a head to be advanced to the playback position through a single step by permitting entrance of the head in an opening of a cartridge simultaneously with insertion of the cartridge into an associated holder, whereby the head is preset at a position which allows a selection of any musical performance.

BRIEF DESCRIPTION OF THE DRAWINGS

Other objects and advantages of the present invention will become apparent from a reading of the following detailed description in conjunction with the accompanying drawings in which.

DETAILED DESCRIPTION OF THE EMBODIMENTS

Figure 1:
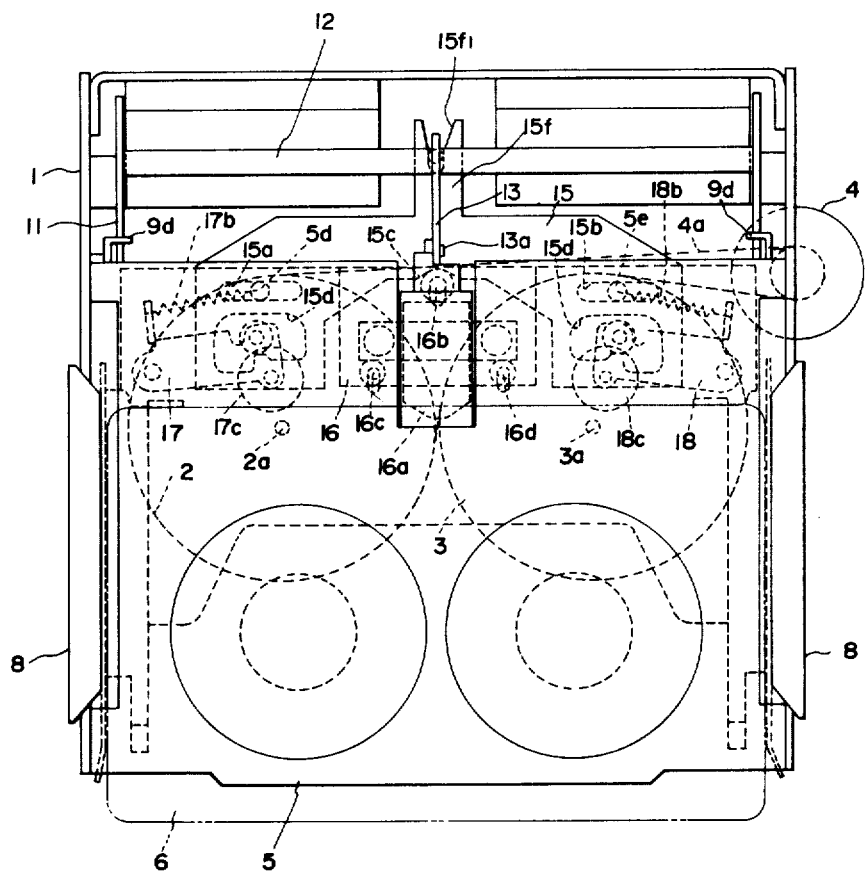
FIG. 1 is a plan view of one preferred embodiment of the present invention.
Figure 2:
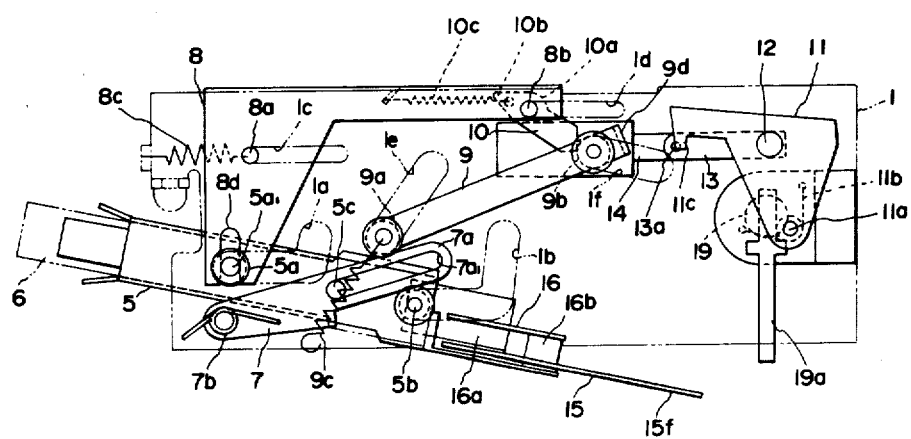
FIG. 2 is a side view of the embodiment prior to insertion of a cartridge.
Figure 4:
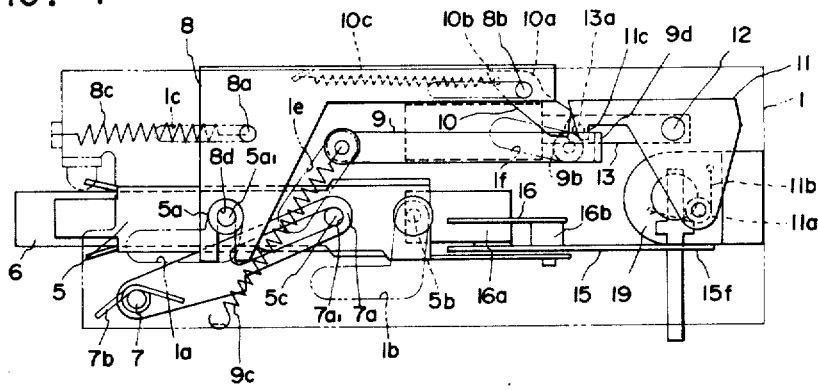
FIG. 4 is a side view of the embodiment upon the completion of insertion of the cartridge.

A chassis 1 is constructed in the form of a housing. Capstan shafts 2a and 3a of flywheels 2 and 3 respectively are symmetrically journalled in a mounting plate, not shown, disposed within the chassis 1. A motor 4 is affixed to the chassis 1 and is connected by a belt 4a to the flywheels 2 and 3. A cartridge holder 5 for accepting a tape cartridge 6 from outside the chassis into the same is provided, on each of opposite vertical sides facing the chassis 1, with three guide rollers 5a, 5b and 5c. The guide rollers 5a and 5b are fitted in L-shaped guide grooves 1a and 1b formed on each vertical side wall of the chassis 1 respectively. Each L-shaped guide groove has a horizontal guide portion and an ascending guide portion. The guide roller 5c is fitted in a guide groove 7a formed on a pressing plate 7 of which will be described afterward. The cartridge holder 5 is guided aslant with respect to the chassis 1 and is aligned horizontally when the guide rollers 5a and 5b reach the upper most ends of the respective guide grooves 1a and 1b. The pressing plate 7 pivoted on the side wall of the chassis 1 at one end is continuously urged by a spring 7b in the direction to close the cartridge holder 5, i.e. in the counterclockwise direction in FIG. 2. A guide groove 7a₁ is formed on an extension 7a of the pressing plate 7. Guide pins 8a and 8b affixed to a sliding plate 8 provided in a horizontally sliding engagement with the chassis are fitted in guide grooves 1c and 1b formed on the side wall of the chassis 1 respectively and are allowed to move forward and rearward, rightward and leftward in FIG. 2, along the side wall of the chassis 1. The sliding plate 8 is urged by a spring 8c extended between the chassis 1 and the guide pin 8a in the direction to eject the cartridge holder 5 toward outside the player, i.e. leftward in FIG. 2. A vertical guide groove 8d is formed on the sliding plate 8 to guide the shaft 5a₁ of the guide roller 5a, therefore, the sliding plate 8 is allowed to advance with the forward movement of the cartridge holder 5. In other words, sliding plate 8 is in vertically sliding engagement with cartridge holder 5. An ejecting lever 9 is provided on opposite ends thereof with guide rollers 9a and 9b which are guided by guide grooves 1e and 1f formed on the side wall of the chassis 1 with an angular relationship of 120° to each other so as to allow the ejecting lever to perform approximately an arcuate movement. This arcuate movement is accomplished provided that said angular relationship is within the range of 90° to 180°. The guide roller 9a is in contact with the upper surface of the leading end of the cartridge holder 5 and is urged by a spring 9c so as to depress the leading end of the cartridge holder 5 to maintain its oblique position. A pawl 10 is pivotally mounted on the guide pin 8b and is allowed to turn in the counterclockwise direction within the arcuate range 10a whereas the turning in the clockwise direction is restricted by contact between a stopping face 10b and the upper rim of the sliding plate 8. A stopper plate 11 pivotally mounted on the chassis 1 by means of a pivot 11a is urged in the clockwise direction by a spring 11b. The left and right stopper plate 11 are coupled by a coupling rod 12 as shown in FIGS. 1 and 2. A connecting lever 13 is rotatably joined with the coupling rod 12 at the center part of the coupling rod 12 and is connected at its front end to a plunger 14 of a solenoid by means of a pin 13a. The front end portion of the stopper plate 11 is formed in a hook 11c which engages with a bend 9d (FIG. 1) with the ejecting lever 9 as illustrated in FIG. 4. Guide pins 5d and 5e are affixed to the extending part of the cartridge holder 5. The guide pins 5d and 5e are guided by guide grooves 15a and 15b respectively of a cam plate 15 so as to guide the transverse movement of the cam plate 15 in FIGS. 1 and 5. A reproducing head 16a is attached to a head mount 16 provided with three guide pins 16b, 16c and 16d directing downward which are guided by guide grooves 5f, 5g and 5h formed on the extending part of the cartridge holder 5 at a leading end thereof. A cam roller 16e mounted on the guide pin 16b is pressed against a cam surface 15e of the cam plate 15 by a spring 16f. Pinch roller holders 17 and 18 are rotatably attached to the cartridge holder 5 by means of pivots 17a and 18a respectively. Said pinch roller holders carry free running pinch rollers thereon and are urged by springs 17b and 18b so as to push the pinch rollers 17c and 18c against the capstan shafts 2a and 3a respectively. Cam rollers 17d and 18d attached to pinch roller holders 17 and 18 are engaged with cam holes 15d and 15e symmetrically formed on the cam plate 15 respectively. The cam holes 15d and 15e comprise raised cam faces $15d_1$ and $15e_1$, intermediate cam faces $15d_2$ and $15e_2$, and recessed cam faces $15d_3$ and $15e_3$ respectively. With the movement of the cam plate 15, the cam rollers 17d and 18d selectively come in contact with those cam faces to control the distances between the pinch rollers 17c and 18c and the capstan shafts 2a and 3a respectively. From the central part of the rear end of the cam plate 15 is projecting an extension 15f having a slot $15f_1$ which is adapted to engage with a pendent pin 19a of a plunger 19 as the cartridge holder 5 moves from the oblique position to the horizontal position.

Figure 3:
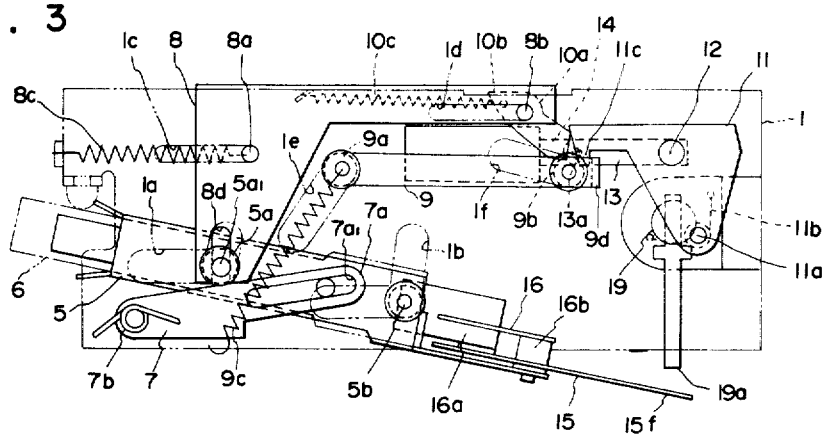
FIG. 3 is a side view of the embodiment in which the cartridge is being moved.

Operation of the mechanism will be described according to the above-mentioned construction. When a cartridge 6 is inserted in the cartridge holder 5 with the opening in front, and then pushed, the cartridge holder 5 is moved parallel from the position of FIG. 2 to the position of FIG. 3 keeping the same inclination as the guide rollers 5a and 5b are guided along the horizontal parts of the guide grooves 1a and 1b and the guide groove $7a_1$ of the pressing plate 7. The sliding plate 8 is advanced with the horizontal movement of the cartridge holder 5 as the shaft $5a_1$ of the guide roller 5a is fitted in the guide groove 8d of the sliding plate 8. The pawl 10 is pivotally fitted on the front guide pin 8b of the sliding plate 8 and the nose is put to the guide roller 9b of the ejecting lever 9 as shown in FIG. 2, therefore, the pawl 10 pushes the guide roller 9b toward the stopper plate 11 with the advancement of the sliding plate 8 and finally, the ejecting lever 9 is forced to move against the spring 9c to the position shown in FIG. 3 along a locus of a circular arc. When the movement of the ejecting lever 9 has been completed, the stopper plate 11 which has been turned to the position shown in FIG. 2 by the spring 11b is turned in the counterclockwise direction by the action of the plunger 14 through the connecting lever 13 and the coupling rod 12 so that the hook 11c of the stopper plate 11 engages with the bend 9d of the ejecting lever 9 to retain the ejecting lever 9 at the position shown in FIG. 3. The guide roller 9b moves downward with respect to the pawl 10 with its rightward advancement as the guide groove 1f by which the guide roller 9b is guided is declined in the direction of advancement of the guide roller 9b, however, the hook 11c engages with the bend 9d of the ejecting lever 9 before the guide roller 9b escapes from the pawl 10 as hereinafter described. When the guide rollers 5a and 5b have reached the respective ends of the horizontal portions of the guide grooves 1a and 1b respectively, the guide rollers 5a and 5b of the cartridge holder 5 are urged into the vertical portions of the guide grooves 1a and 1b respectively as the cartridge holder 5 is continuously pushed upward by the spring force of the spring 7b applied to the pressing plate 7 and the guide roller 9a which has been depressing the cartridge holder 5 has already been moved upward. Accordingly, the cartridge holder 5 is allowed to turn slightly from the slanted state shown in FIG. 3 to the horizontal state shown in FIG. 4 while the ejecting lever 9 is retained above said horizontal position. Thus when the cartridge holder 5 has been set in the horizontal position, the capstan shafts 2a and 3a are in alignment with the corresponding holes on the cartridge 6, therefore the cartridge 6 does not interfere with the capstan shafts 2a and 3a during its shift to the horizontal position allowing the capstan shafts 2a and 3a to accurately fit in the capstan shaft receiving holes on the cartridge 6. The cartridge holder 5 moves slightly forward (rightward in FIGS. 3 or 4) during its transition from the slanted position shown in FIG. 3 to the horizontal position shown in FIG. 4 as the vertical portions of the guide grooves 1a and 1b are slightly inclined in the clockwise direction. Thus the capstan shafts 2a and 3a are accurately aligned with the respective centers of the capstan shaft receiving holes on the cartridge 6 when the cartridge holder 5 has been moved to the horizontal state. The sliding plate 8 and the pawl 10 also are advanced with the advancement of the cartridge holder 5 during the transition of the cartridge holder 5 from the slanted position to the horizontal position whereby the pawl 10 pushes the guide roller 9b of the ejecting lever 9 so that the guide roller 9b is made to move further forward as well as downward, and finally, the pawl 10 rides over the guide roller 9b. When the cartridge has been disposed horizontally through the process as hereinbefore described, reel shafts, not shown, descend and fit in the corresponding reel hubs of the cartridge 6 in the manner as described in detail in Japanese Patent Application No. 62908/79. During the transition of the cartridge holder 5 from the slanted position to the horizontal position, the extension 15f of the cam plate 15 approaches the pendent pin 19a of the plunger 19 diagonally from under the pendent pin 19a, and when the cartridge holder 5 has been perfectly aligned in the horizontal position, the slot $15f_1$ of the extension 15 engages with the pendent pin 19a as shown by long and two short dashes lines in FIGS. 4 and 5, thus completing the setting of the cartridge 6. At the completion of the setting of the cartridge 6, the head 16a has already been positioned at the REW- or FF-position, being inserted into the opening of the cartridge 6 as shown in FIG. 1. At this position, the head 16a lightly contacts the tape surface such that non-recorded areas between musical performances are detected during rewinding or fast forward winding.

Figure 5:
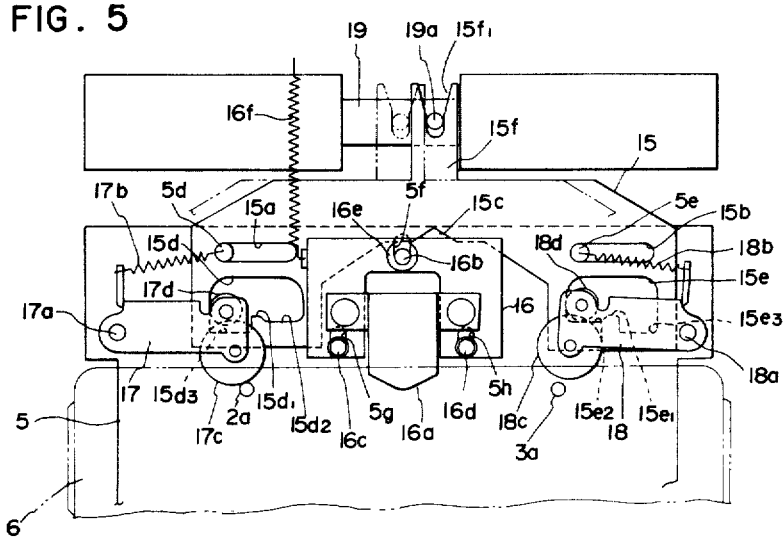
FIG. 5 is a plan view showing the operation of a head, pinch rollers etc.

Referring to FIG. 5, in reproducing the records by driving the tape from the right to the left, the solenoid is energized to shift the plunger 19 from the position shown by the phantom lines to the position shown by the continuous lines. With the shifting of the plunger 19, the cam plate is moved rightward through the pendent pin 19a and the extension 15f. With the movement of the cam plate 15, the cam face 15c pushes the cam roller 16e causing the head mount 16, that is the reproducing head 16a, to be pushed against the tape surface. On the other hand, with the rightward movement of the cam plate 15, the cam rollers 17d and 18d of the pinch roller holders 17 and 18 respectively are moved from the raised cam faces $15d_1$ and $15e_1$ of the cam holes 15d and 15e to the recessed cam face $15d_3$ and the intermediate cam face $15e_2$ respectively. With the movement of the cam roller 17d to the recessed cam face $15d_3$, the pinch roller holder 17 is allowed to turn slightly in the clockwise direction under the action of the spring 17b. The recessed cam face $15d_3$ is recessed deep enough to allow the pinch roller 17c to be pressed against the capstan shaft 2a before the cam roller 17d come in contact with the recessed cam face $15d_3$. With the movement of the cam roller 18a to the intermediate cam face $15e_2$, the pinch roller holder 18 is allowed to turn slightly in the counterclockwise direction under the action of the spring 18b. The intermediate cam face $15e_2$ is so formed that the cam roller 18d comes in contact with the intermediate cam face 15e₂ before the pinch roller 18c comes in contact with the capstan shaft 3a so that the pinch roller 18c is stopped with a small gap between the pinch roller 18c and the capstan shaft 3a (FIG. 5). Thus, with the movement of the cam plate 15, the reproducing head 16a and the pinch rollers 17c and 18c are simultaneously advanced and set to the respective operating positions, and then the tape is driven leftward and the reproducing of the records is started by supplying electricity to the motor 4. In reproducing the records by driving the tape rightward, the cam plate 15 is shifted to the left, then the component members operate in the opposite directions with respect to the directions as hereinbefore described referring to the case when the cam plate 15 is shifted to the right, however, detailed description will be omitted to avoid duplication.

The cartridge ejecting operation will be described hereunder. When an eject lever, not shown, is operated, first the solenoid is energized to actuate the plunger 19 which returns the cam plate 15 to the neutral position so that the reproducing head 16a and the pinch rollers 17c and 18c are retracted. When the solenoid including the plunger 14 is unenergized, the stopper plate 11 is turned in the clockwise direction by the action of the spring 11b so that the hook 11c and the bend 9d of the ejecting lever 9 are disengaged. At the beginning of this disengagement when the component members are arranged as shown in FIG. 4, the guide roller 9b of the ejecting lever 9 is separated from the pawl 10, therefore, when the bend 9d is released from the hook 11c, the ejecting lever 9 is allowed to move from the position of FIG. 3 to that of FIG. 2 under the action of the expansion spring 9c. During this movement of the ejecting lever 9, the guide roller 9a pushes down the cartridge holder 5 against the lifting force of the pressing plate 7 so that the guide rollers 5a and 5b are pushed down along the respective vertical portions of the guide grooves 1a and 1b formed on the chassis 1 respectively and the cartridge holder 5 is moved to the slanted position. When the guide rollers 5a and 5b of the cartridge holder 5 have reached the lower most parts of the respective guide grooves 1a and 1b, the cartridge holder 5 is pulled by the spring 8c through the guide pin 8a, the sliding plate 8, the guide groove 8d, the shaft 5a₁ of the guide roller 5a in the ejecting direction, i.e. to the left in FIG. 3, consequently, the guide rollers 5a and 5b move along the horizontal portions of the guide grooves 1a and 1b respectively leftward thus ejecting the cartridge holder 5 as shown in FIG. 2 and facilitating the replacement of the cartridge 6. During the leftward movement of the pawl 10 together with the leftward movement of the sliding plate 8, the pawl 10 rides over the guide roller 9b as it is turned in the counterclockwise direction against the action of the spring 10c as the guide roller 9b of the ejecting lever 9 has previously been returned to the left side position. Finally, the pawl 10 is restored to the position shown in FIG. 2.

It will be understood that, while the foregoing guide mechanism has been described as being of the type wherein a cartridge holder is advanced in a slantwise state and then moved upwardly to a horizontal state while it is slightly turned, it may be of the system wherein the cartridge holder is advanced in a horizontal state and moved vertically in parallel manner.

According to the present invention, a head is mounted on the leading edge of an associated holder such that they are movable in integral fashion, so that when the cartridge is inserted into the associated holder, the head is preset at the position for selecting any required musical performance in an opening of the cartridge. Thus, the head is located at the playback position through a single step, leading to simplification of the player mechanism and enhancement of reliability, and rendering possible the production of compact and lightweight tape players.

What is claimed is:

1. A player for magnetic tape cartridge recording and playback operation comprising:
   a chassis having a main surface;
   a cartridge holder mounted for motion within said chassis and adapted to receive a tape cartridge from without said chassis at an initial oblique position with respect to the main surface;
   guide means associated with said cartridge holder and including at least one set of guide grooves, each including a first groove portion parallel to the main surface and a second groove portion extending from the first groove portion substantially perpendicularly thereto, said guide means allowing said cartridge holder to be translated into said chassis to an intermediate oblique position along the first groove portion and then turned from the intermediate oblique position to a position parallel to the main surface; and
   a reproducing head movably mounted on said cartridge holder at the leading end thereof.

2. The player according to claim 1 wherein said reproducing head is affixed to a head mount which is movably mounted on said cartridge holder.

3. The player according to claim 1 which further comprises:
   a pair of capstan shafts symmetrically provided within said chassis;
   a pair of pinch roller holders pivotally attached to said cartridge holder in association with said capstan shafts, said pinch roller holders each carrying a free-running pinch roller adapted to be pushed against the capstan shaft.

4. The player according to claim 3 which further comprises a cam plate provided on said cartridge holder for sliding movement in a predetermined direction and having a pair of first cam faces, each adapted to actuate the corresponding pinch roller holder to push its pinch roller against the corresponding capstan shaft.

5. The player according to claim 4 wherein said cam plate is mounted on said cartridge holder through a pin and a slot formed in one and the other movement in the predetermined direction.

6. The player according to claim 4 wherein the reproducing head is affixed to a head mount which is movably mounted on said cartridge holder, and said cam plate has a second cam face engageable with said head mounted to push the reproducing head in contact with the tape of said tape cartridge when said cartridge holder with the tape cartridge is at the main surface parallel position.

7. The player according to claim 6 which further comprises actuating means in the form of a plunger having a pendant pin, wherein said cam plate has a slot engageable with said pendant pin, whereby said cam plate is moved in the predetermined direction by said actuating means.

8. The player according to claim 7 wherein said pinch roller holder has cam follower means in the form of a guide pin having a rotatable roller in engagement with said first cam face.

9. The player according to claim 7 wherein said head mount has cam follower means in the form of a guide pin having a rotatable roller in engagement with said second cam face.

10. The player according to claim 7 wherein said head mount is mounted on said cartridge holder through a pin and a slot formed in one end and the other for movement in a direction perpendicular to the predetermined direction.

* * * * *